Aug. 11, 1931.     J. A. RAPELJE     1,818,099
DRIVE RING
Filed June 29, 1928

INVENTOR
JOHN A. RAPELJE
BY J. MacDonald
ATTORNEY

Patented Aug. 11, 1931

1,818,099

UNITED STATES PATENT OFFICE

JOHN A. RAPELJE, OF BOONTON, NEW JERSEY, ASSIGNOR TO BELL TELEPHONE LABORATORIES, INCORPORATED, OF NEW YORK, N. Y., A CORPORATION OF NEW YORK

DRIVE RING

Application filed June 29, 1928. Serial No. 289,243.

This invention relates to a hammer drive ring for securing wires and the like to supporting surfaces.

The object of the invention is to provide an improved drive ring for supporting wires and the like which will effect economy in the cost of manufacture and material.

In accordance with this invention, a U-shaped member having an eyelet at one end, is formed out of a heavy piece of wire, the other end being straight and offset slightly out of alignment with the eyelet. A headless nail, formed of heavy wire having a collar thereon, is forced through the eyelet portion of the U-shaped member, until the collar bears against the eyelet. This construction provides a drive ring which will stand a great amount of strain and yet not be unsightly in appearance. This construction also permits the use of this ring with a cable clamp when it is desirable to run wires parallel to the cable.

Figure 1:
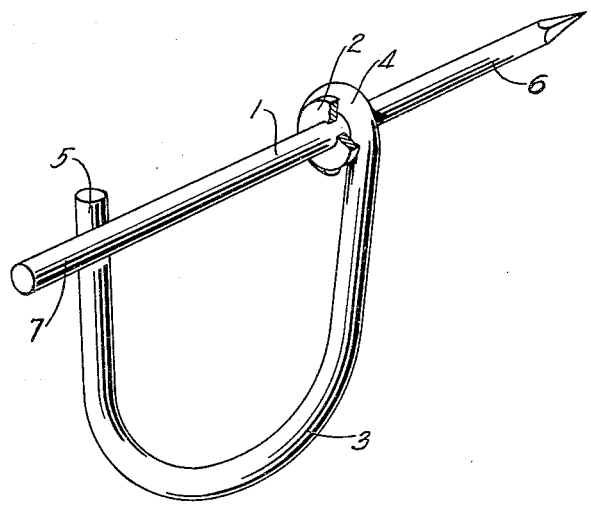
Figure 2:
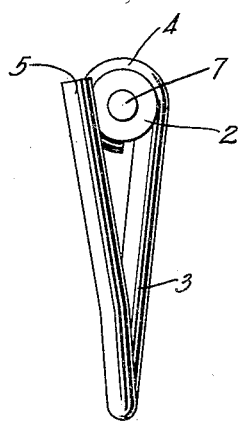

Referring now to the drawings, Fig. 1 is a perspective view of the drive ring and Fig. 2 is a front elevation of Fig. 1.

The improved drive ring is composed of two members formed out of heavy wire and consists of a nail member 1, having a collar 2, thereon, and a U-shaped member 3, said U-shaped member having one of its ends bent back upon itself to form an eyelet 4. The free end 5, of the U-shaped member 3, is offset slightly out if alignment with the eyelet 4, as shown in Fig. 2, so that when the lower portion 6, of the nail member 1, has been forced through the eyelet 4, and the collar 2, bears against said eyelet, a space will be provided between the upper end 7, of the nail member 1, and the free end 5 of the U-shaped member 3.

While there is shown and described herein the preferred form of the invention, it is understood that it is not limited or confined to the precise details of construction herein described as modifications and variations may be made without departing from the spirit of the invention.

What is claimed is:

1. A drive ring comprising a single piece of wire bent to form a substantially U-shaped member, one leg of which is straight, the other having an eyelet formed thereon, and means extending through said eyelet for securing the drive ring to a supporting surface, said securing means extending from the eyelet portion to said straight leg portion to substantially close the top of said U-shaped member.

2. A drive ring comprising a single piece of wire bent to form a substantially U-shaped member, one leg of which is straight, the other having an eyelet formed thereon, and means extending through said eyelet having a collar thereon bearing against said eyelet for securing the drive ring to a supporting surface, said securing means extending from the eyelet portion to said straight leg portion to substantially close the top of said U-shaped member.

3. A drive ring comprising a single piece of wire bent to form a substantially U-shaped member, one leg of said member being straight, the other having an eyelet formed thereon, said straight leg being slightly offset out of alignment with said eyelet, and means extending through said eyelet for securing said drive ring to a supporting surface, said securing means extending from the eyelet portion to the said straight leg portion to substantially close the top of said U-shaped member.

4. A drive ring comprising a single piece of wire bent to form a substantially U-shaped member, one leg of said member being straight, the other bent back upon itself to form an eyelet thereon, said straight leg being slightly offset out of alignment with said eyelet, and means having a collar thereon extending through and bearing against said eyelet for securing said drive ring to a supporting surface, said securing means extending from the eyelet portion to said straight leg portion to substantially close the top of said U-shaped member.

In witness whereof, I hereunto subscribe my name this 28th day of June, 1928.

JOHN A. RAPELJE.